UNITED STATES PATENT OFFICE.

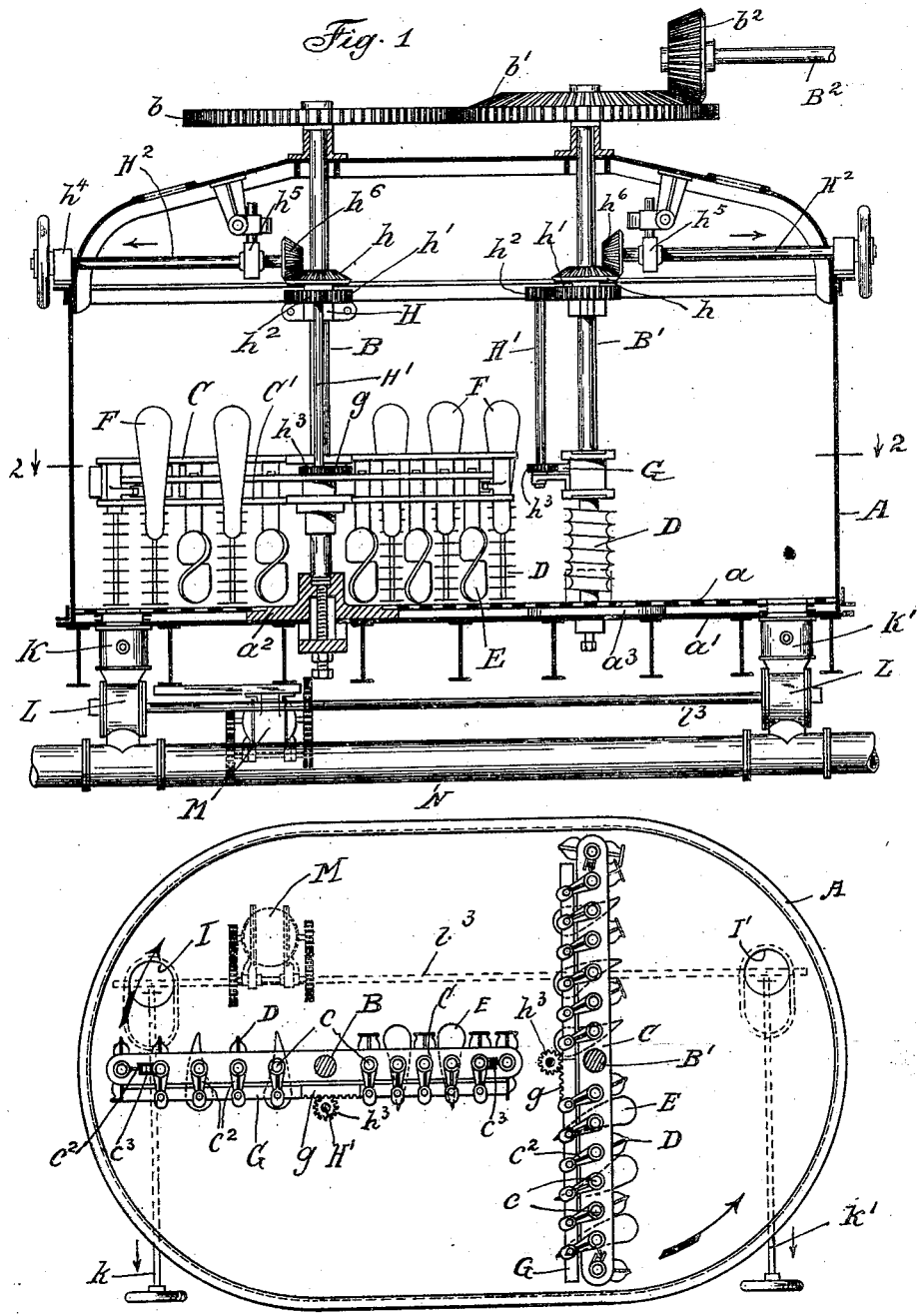

ANDREAS REINHARD KELLER, OF CHICAGO, ILLINOIS.

MASHING-MACHINE.

No. 922,486.  Specification of Letters Patent.  Patented May 25, 1909.

Application filed October 10, 1907. Serial No. 396,731.

*To all whom it may concern:*

Be it known that I, ANDREAS REINHARD KELLER, a citizen of the United States, and residing at Chicago, in the county of Cook and State of Illinois, have invented a new and useful Improvement in Mashing-Machines, of which the following is a complete specification.

Heretofore mashing machines have usually been provided with a set of stirrers or beaters which travel in the tub about a single axis and tend to create a current in the mash in the direction of their travel. Owing to this fact, after the mash has once been set in motion, it tends to travel with the stirrers so that each stirrer operates upon the same particles of the mash instead of causing the particles to move about in the tub without any definite course.

The object of this invention is to provide a mashing machine in which all particles of the mash are caused to travel throughout the tub in a great diversity of directions in both horizontal and vertical planes, so as to prevent the creation of well defined currents and thoroughly mix the mash in a minimum amount of time.

It is also an object of the invention to provide a device capable of directing the wort and the thinner and lighter portions of the mash downwardly toward the bottom of the tub so as to bring all the particles of the grain into contact therewith.

The invention consists of the matters hereinafter described in the specification and more fully pointed out and defined in the appended claims.

In the drawings: Figure 1 is a vertical section of the mash tub, and showing the stirring mechanism and operating means therefor in side elevation. Fig. 2 is a horizontal section of the stirring mechanism taken on line 2—2 of Fig. 1, and showing the tub with the top removed.

As shown in said drawings: A indicates the mash tub of any desired material and construction but which, as shown, is oblong in shape. Said tub is provided with the usual perforated bottom $a$ above the bottom $a'$ for the purpose of separating the wort after the mashing operation is completed. Engaged on said bottom $a'$ at points approximately one third of the length of the tub from the adjacent ends, are two bearings indicated by $a^2$ and $a^3$ respectively, and in which the stirrer shafts B—B' are journaled. On each of said stirrer shafts is a set of stirrers which are revolved in opposite directions by means of the intermashing gears $b$—$b'$ on said shafts above the tub, and the gear $b'$ is driven by a beveled pinion $b^2$ on the drive shaft $B^2$. The stirrers of each set are identical in construction with those of the other so that a description of one set will suffice for both. On the stirrer shaft is rigidly engaged an upper and a lower horizontal arm C and C' which project equal distances on opposite sides of the shaft and are of such a length that those on one shaft overlap the area covered by those of the other as shown more clearly in Fig. 2. The stirrers are mounted on said arms by means permitting of their being partially rotated to adjust their inclination to their direction of travel. For this purpose a plurality of pivot shafts $c$ are journaled in said arms and are secured therein by means of sleeves $c'$ which are clamped to the shafts between said arms, as shown more clearly in Fig. 2. Alternately arranged on said pivot shafts are the shovels D and spiral blades or plows E, which are similar in construction to those shown in United States Letters Patent No. 896,920 issued to me August 25, 1908, for mashing machines, and operate in a similar manner. Rigidly engaged on the upper ends of a portion of said pivot shafts are the wort deflectors or hoods F, which are also similar to those shown in the above mentioned patent. Each of said sleeves $c'$ is provided with a lever $c^2$ all of which, with the exception of the end ones, project from the same side of the arms, and a rack bar G, having a central rack $g$ thereon, is bolted thereto. The end levers $c^2$ are directed longitudinally of the arms and are engaged by a fork $c^3$ on the sleeve of the adjacent stirrer which acts to turn the end stirrer oppositely from the next adjacent stirrer for the purpose of directing the grain to the outlet when emptying the tub.

A collar H is rigidly engaged on the stirrer shaft above the stirrers, and a beveled gear $h$ and a plain gear $h'$ are rigidly connected together and journaled on said collar. A vertical shaft H' is journaled in bearings on said collar and said arms and is provided with pinions $h^2$ and $h^3$, the former of which meshes with the gear $h'$ and the latter of which meshes with the rack $g$. A longitudinally movable shaft $H^2$ is supported in bearings $h^4$ and $h^5$ on the top of the tub and is provided on its inner end with a beveled pinion $h^6$ adapted when the shaft is at the inner limit of its movement to mesh with the beveled gear *h*. Near each end of said tub is an outlet port indicated by I and I' which open into valve housings K and K' and are controlled by slide valves *k* having an operating handle *k'*. A force feed valve L is engaged beneath each valve casing and a shaft $l^3$ connects said valves, and as shown is driven by a motor M supported beneath the tub. The force feed valves open into a pipe N through which a blast of air is forced by any suitable means and which acts to convey the grain away when the tub is to be emptied.

The operation is as follows: In as much as the stirrer shafts are geared to rotate oppositely, the sets of stirrers are rotated oppositely, as shown by the arrows in Fig. 2. This tends to cause a current in the mash at each end of the tub traveling in opposite directions, and as these currents must cross at the center of the tub, innumerable counter currents are set up throughout the tub without any well defined direction of travel and causing the whole mass to become throughly intermingled. The stirrers and deflecting hoods of course act to turn the grain over and direct the wort down into it as before described. When the mash has been thoroughly mixed the wort is drawn off in the usual manner and the stirrers are set at an angle by means of the shafts $H^2$ operating the rack bars G. This directs the grain toward the outlet ports where it is discharged into the air pipe and conveyed away.

Obviously a mashing machine constructed in accordance with my invention acts to very quickly and thoroughly form the mash and is of such simple construction as to not readily get out of repair. Obviously also the construction of the stirrers is such that a very quick and efficient discharge of the grain may be accomplished.

I claim as my invention:

1. In a device of the class described the combination with a tub of a pair of vertical stirrer shafts journaled in the top and bottom thereof, means for rotating said shafts in opposite directions, horizontal arms on said shafts, the path of those on one shaft being adapted to intersect that of those on the other shaft, and a plurality of adjustable stirrers journaled in said arms.

2. In a device of the class described the combination with a tub of a pair of stationary but rotatable, vertical shafts journaled therein, means for rotating said shafts oppositely, horizontal arms on said shafts, those on each shaft being of a length to overlap the adjacent arm on the other shaft when parallel therewith, a plurality of stirrers journaled on said arms, an outlet port for each set of stirrers and means for adjusting the stirrers to direct material to said outlets.

3. In a device of the class described the combination with a tub of two sets of stirrers therein, each adapted to revolve in a horizontal plane, means for rotating said sets in opposite directions with the path of one intersecting that of the other, an outlet port for each set of stirrers, and means for independently adjusting each set of stirrers to direct material toward its outlet.

4. In a device of the class described the combination with a tub of two sets of stirrers therein adapted to travel oppositely in horizontal planes and each set to intersect the path traveled by the other, means for rotating said sets in opposite directions, an outlet port near each end of the tub and means for adjusting said stirrers to carry the material to said outlets.

5. In a device of the class described the combination with a tub of a plurality of vertical shafts journaled therein, means for rotating said shafts, arms on said shafts, those on each shaft being of a length to partially overlap the adjacent arms of the other when parallel therewith, stirrers pivoted on said arms and means for adjusting the inclination of the stirrers on each arm independently of the others.

6. In a device of the class described the combination with a tub of a pair of vertical shafts journaled therein, means for rotating said shafts oppositely, a horizontal arm on each shaft, each adapted to partially overlap the other when parallel therewith, stirrers pivoted thereon, a rack bar connected with the stirrers on each arm and means for operating said rack bars to vary the inclination of said stirrers.

In testimony whereof I have hereunto subscribed my name in the presence of two witnesses.

ANDREAS REINHARD KELLER.

Witnesses:
H. B. HICKOK,
B. ZEITZ.